Oct. 7, 1969     T. EVANS     3,470,682
CORN HARVESTER
Filed Oct. 28, 1966     2 Sheets-Sheet 1
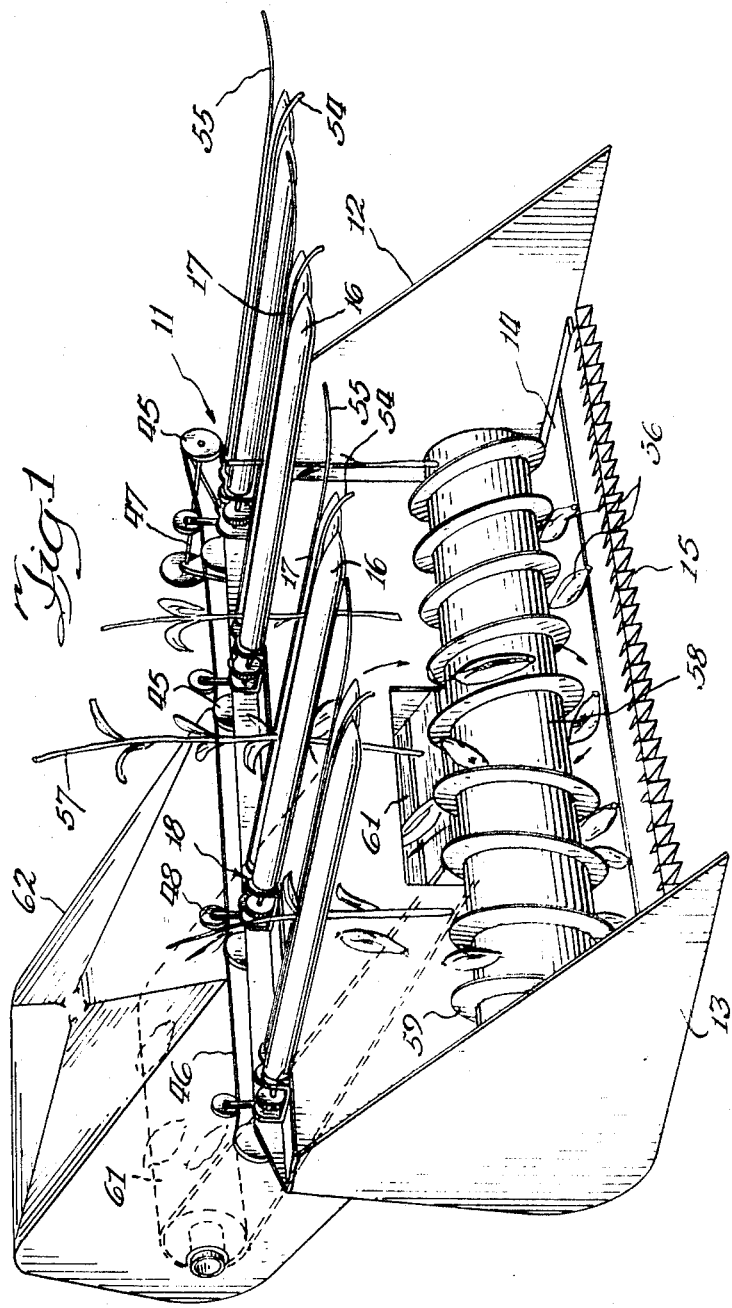
INVENTOR
Thomas Evans
BY Dressler, Goldsmith, Clement & Gordon
ATTORNEYS

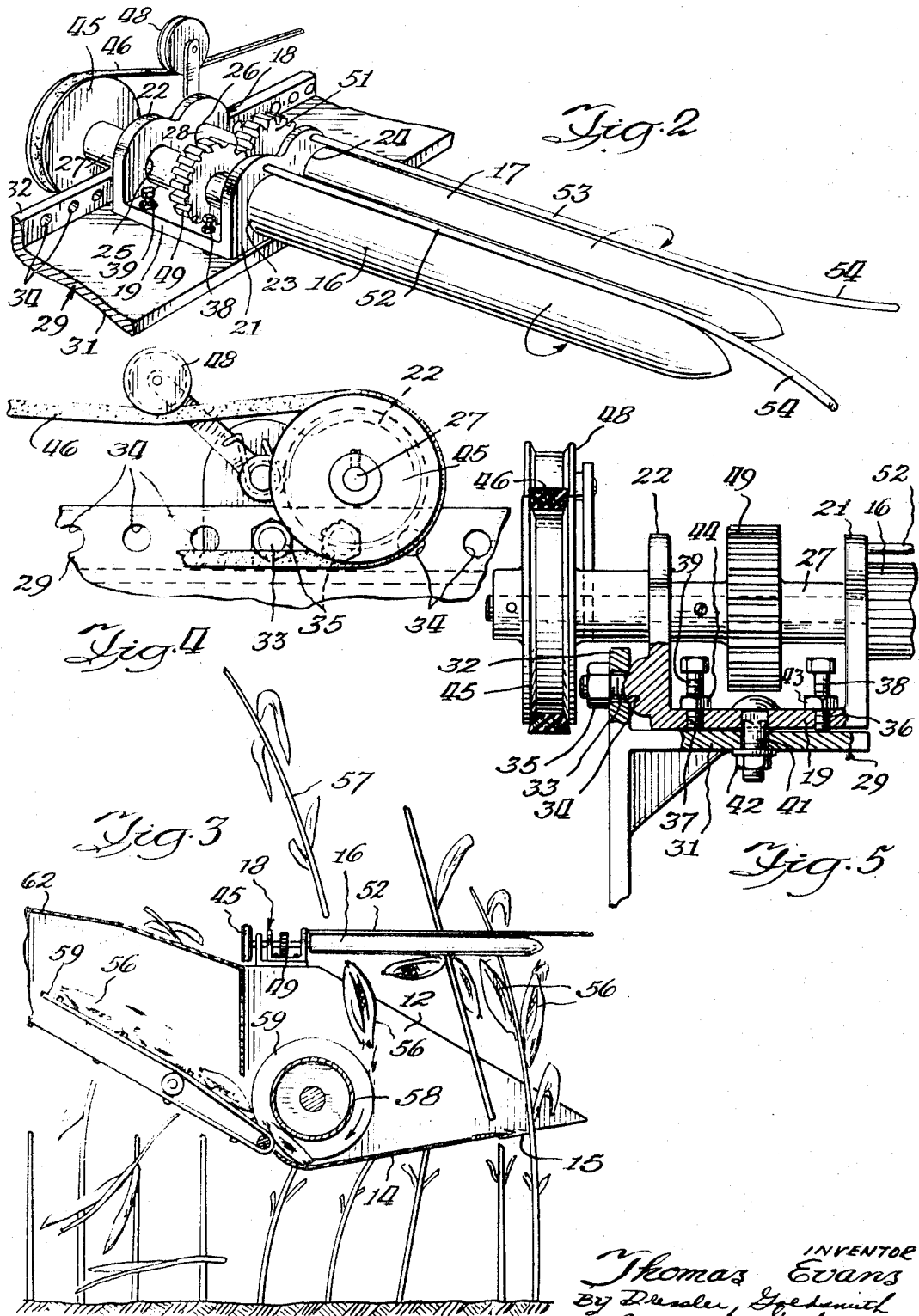

United States Patent Office 3,470,682
Patented Oct. 7, 1969

3,470,682
CORN HARVESTER
Thomas Evans, Bettendorf, Iowa, assignor to J. I. Case Company, a corporation of Wisconsin
Filed Oct. 28, 1966, Ser. No. 590,237
Int. Cl. A01d 45/02, 57/20
U.S. Cl. 56—105                                 2 Claims

ABSTRACT OF THE DISCLOSURE

A corn harvesting attachment for a combine including a plurality of pairs of snap rolls which are rotated in opposite directions, the lateral positions of which can be adjusted. There is also provided guide means for guiding stationary stalks of corn between the snap rolls of each pair and for cutting the stationary stalks below the ears of corn thereon. The corn so snapped off the stalks is conveyed into the combine to the separating mechanism disposed therein.

---

This invention relates to a corn harvesting mechanism, and is particularly concerned with a corn harvesting mechanism that may be attached to a combine, or other suitable machine, and may be adjusted for use with rows of standing corn of various lateral spacings.

Various machinery has been used in the past for harvesting a plurality of rows of corn simultaneously, but such machinery has not been entirely satisfactory when the lateral spacing of the rows varies from the width for which the machinery was originally designed. For example, if 28-inch rows are harvested with a 30-inch corn head, the outer row unit of a 4-row head may be four inches off center, and in a 6-row head may be off six inches.

The corn header constructed in accordance with the present invention includes means for adjusting the lateral spacing of a plurality of pairs of snap rolls to enable it to be used efficiently with rows of corn regardless of the lateral spacing between them. The snap rolls are also adjustable vertically to insure engagement with the stalks above the uppermost ears on the stalks. In addition, the snap rolls are provided with guide means for aligning stalks that may be slightly out of alignment.

Functionally speaking, the snap rolls pull the stalks upwardly as they are cut below the ear bearing portion. As the ears of corn are snapped off, they drop to the header platform and are delivered to the separating mechanism of the combine. The stalks are ejected upwardly above the header, and the movement of the combine causes them to fall rearwardly over the header platform.

Suitable structure by means of which the above mentioned and other advantages of the invention are attained will be fully described in the following specification, taken in conjunction with the accompanying drawings showing a preferred embodiment of the invention, in which:

FIGURE 1 is a perspective view of a corn harvesting attachment embodying the invention;

FIGURE 2 is an enlarged fragmentary view showing the means for mounting and driving a pair of snap rolls;

FIGURE 3 is a fragmentary side elevational view showing the snap roll and the means for conveying the ears to the combine;

FIGURE 4 is a fragmentary front elevational view showing the tension means for keeping the driving belt tightened; and FIGURE 5 is a fragmentary cross-sectional view showing the means for adjusting the vertical angularity of the snap rolls.

In the drawings, a corn harvesting mechanism 11 comprises a frame 12 adapted to be secured to a combine or other machine by which it is moved across a field to be harvested. The frame 12 has a pair of end walls 13 and a platform 14 extending transversely between the end walls. A cutter bar 15 is mounted at the front edge of the platform, and a plurality of pairs of snap rolls 16 and 17 are mounted above the platform in a manner hereinafter described.

As the harvesting mechanism is moved into engagement with the stalks of corn, the cutter bar 15 severs each stalk at a predetermined height above the ground at the same time its upper portion is grasped by two cooperating snap rolls. The snap rolls 16 and 17 are arranged in pairs and a bracket 18 provides cantilevered support for each pair of rolls. As shown in FIGURE 5, each bracket comprises a flat base plate 19 and upstanding end walls 21 and 22 at opposite ends of the base plate. The end wall 21 is provided with two apertures 23 and 24, respectively, and the end wall 22 is provided with apertures 25 and 26 axially aligned with the apertures 23 and 24, respectively (see FIGURE 2). The apertures 23 and 25 provide bearing support for the shaft 27 of the snap roll 16, and the apertures 24 and 26 provide bearing support for the shaft 28 of the snap roll 17.

The brackets 18 are adjustably mounted on an angular support member 29 that extends transversely of the frame 12 adjacent its rear upper edge and is secured thereto in any suitable manner. The support member 29 comprises a horizontal flange 31 and a vertical flange 32. The brackets 18 are mounted on the flange 31 in laterally spaced relationship and are held in any desired lateral positions by a stud 33 projecting rearwardly from the end wall 22 through any one of a series of laterally spaced apertures 34 in the flange 32. A nut 35 is preferably threaded on the end of the stud 33. The stud 33 is of less diameter than the aperture 34 so as to provide clearance therebetween. The clearance permits angular movement of the bracket 18 relative to the flange 31 to vary the vertical angularity of each pair of snap rolls.

The base plate 19 is provided with two threaded apertures 36 at opposite edges adjacent the end wall 21 and with two threaded apertures 37 at opposite edges adjacent the end wall 22. A set screw 38 is threaded in each aperture 36, and a set screw 39 is threaded in each aperture 37. The outer end of the pair of snap rolls may be inclined upwardly by screwing the screws 38 downwardly against the flange 31, and the screws 39 may be screwed downwardly against the flange 31 to incline the snap rolls downwardly. When the snap rolls are inclined at the desired angle, the bracket may be secured against angular displacement by a screw 41 that extends through aligned apertures in the base plate 19 and the flange 31. A nut 42 is tightened against the bottom of the flange 31 to prevent the screw 41 from becoming loosened accidentally. Lock nuts 43 and 44 are preferably provided on screws 38 and 39, respectively.

In order to drive the rolls, each shaft 27 extending through the aperture 25 has a pulley 45 secured thereto. The pulleys 45 are each engaged by a common belt 46 that is driven from any suitable power source through a shaft 47. A spring-pressed tension roll 48 engages the belt 46 adjacent each pulley 45 to insure uniform tension between the belt 46 and each of the pulleys so that the snap rolls 16 are all driven at the same speed. A gear 49 mounted on each shaft 27 is meshed with a gear 51 on the adjacent shaft 28 to drive the snap rolls 17 in the opposite direction.

To guide the stalks into the snap rollers, a guide member 52 is mounted above each snap roll 16, and a similar guide member 53 is mounted above each snap roll 17. The guide members project forwardly from the wall 21 of the bracket 18 and are parallel to the snap rolls for most of their length. Each guide member extends forwardly of the adjacent snap roll, and the guide members adjacent each pair of snap rolls are curved away from each other at their outer ends, as indicated at 54 and 55, respectively. The guide members direct the corn stalks into the space between the snap rolls of each pair of rolls as the machine, to which the corn harvesting mechanism is attached, is driven across the field.

The oppositely directed rotation of the snap rolls 16 and 17 causes them to pull the stalks upwardly between them as the stalks are cut by the cutter bar 15. The ears 56 are snapped off by the rolls 16 and 17, and the stalks 57 are discharged upwardly of the rolls. The forward movement of the machine causes the stalks to fall rearwardly of the platform 14 as they are released by the snap rolls.

The ears 56 drop to the platform and are moved inwardly toward the center of the platform by an auger 58 haging blades 59 extending helically of the auger and oppositely directed on opposite sides of the transverse center of the auger. The auger carries the ears around its circumference, and at the central area drops them on to a belt conveyor 61 which carries them to the combine. A housing or shelf 62 may be provided to cover any exposed portion of the conveyor to prevent the stalks 57 from falling on the conveyor.

Although a preferred embodiment of the invention has been described in considerable detail, it will be understood that the description thereof is intended to be illustrative, rather than restrictive, as many details or construction may be modified or changed without departing from the spirit or scope of the invention. Accordingly, it is not desired to be restricted to the exact details of structure described.

What is claimed is:

1. A corn harvesting attachment for a combine header comprising a platform, a frame member, a plurality of pairs of snap rolls secured to said frame member above said platform, means for adjusting the lateral positions of said pairs of snap rolls, means for rotating the snap rolls of each pair in opposite directions, guide means extending adjacent each of said pairs of snap rolls for guiding standing stalks of corn between the snap rolls of each pair, means for cutting said standing stalks below the lowermost ears of corn on said stalks, the snap rolls of each pair being adapted to pull the stalks guided therebetween upwardly and to drop the ears of corn separated from said stalks on to said platform, and conveyor means for delivering said ears of corn from said platform to the separating mechanism of said combine.

2. A corn harvesting attachment as recited in claim 1 and having a plurality of bracket means providing cantilever support for a pair of snap rolls and including means for adjusting the vertical inclination of said snap rolls relative to said bracket means.

References Cited

UNITED STATES PATENTS

| | | | |
|---|---|---|---|
| 1,390,159 | 9/1921 | Price | 56—106 XR |
| 3,271,940 | 9/1966 | Ashton et al. | 56—105 |

ANTONIO F. GUIDA, Primary Examiner

U.S. Cl. X.R.

56—18